Figure 1:
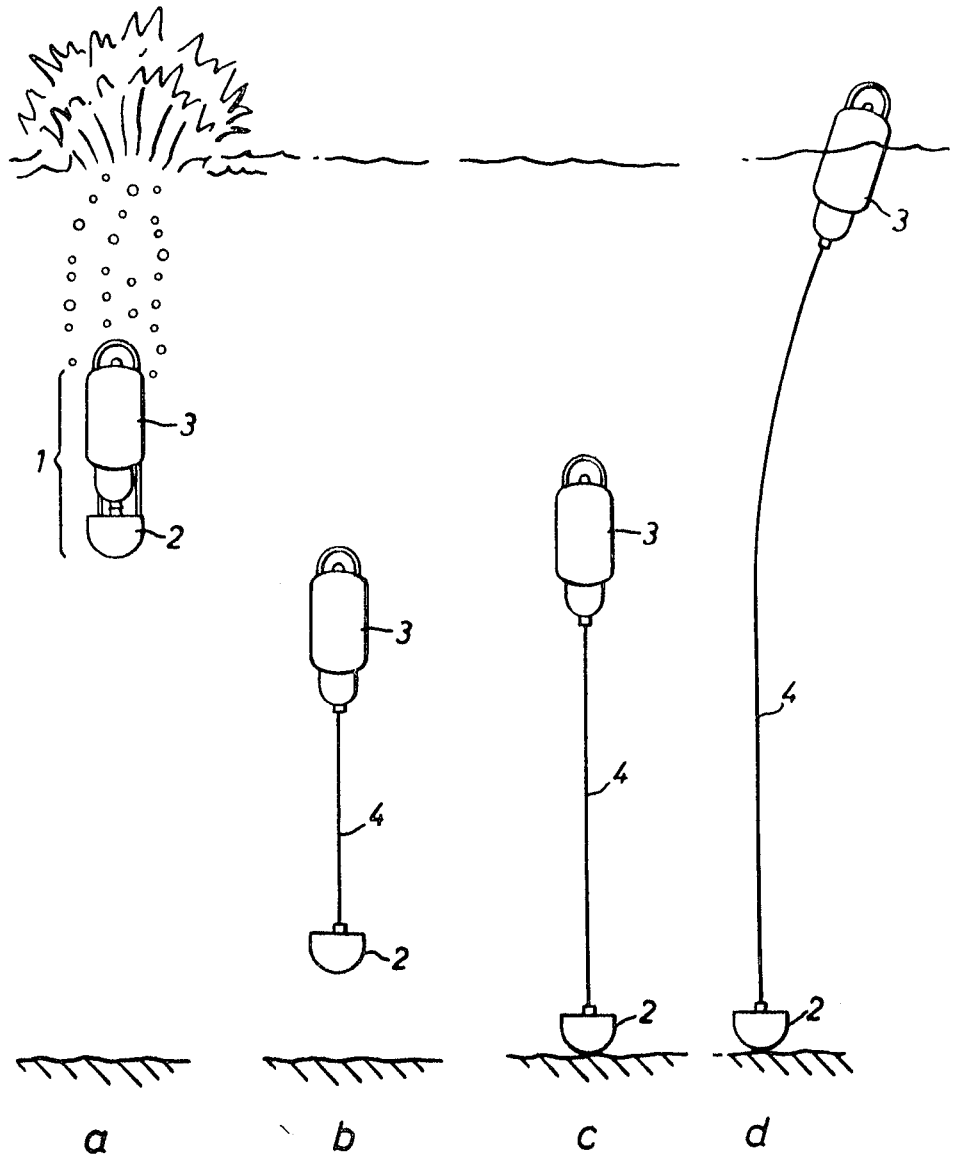

United States Patent

[11] 3,628,205

| [72] | Inventors | Bertrand Julian Starkey; Alexander Smith Watson, both of Dartmouth, Nova Scotia, Canada |
|---|---|---|
| [21] | Appl. No. | 783,382 |
| [22] | Filed | Dec. 12, 1968 |
| [45] | Patented | Dec. 21, 1971 |
| [73] | Assignee | EMI Limited Hayes, Middlesex, England |
| [32] | Priority | Jan. 31, 1968 |
| [33] | | Great Britain |
| [31] | | 4,906/68 |

[54] OCEANOGRAPHIC SURVEY DEVICE
6 Claims, 5 Drawing Figs.

[52] U.S. Cl. .................................................. 9/8 R, 340/2
[51] Int. Cl. .................................................. B63b 21/16
[50] Field of Search .................................... 9/8; 340/2

[56] References Cited
UNITED STATES PATENTS

| 3,293,676 | 12/1966 | Link | 9/8 |
| 3,402,687 | 9/1968 | Tsuji | 9/8 |
| 2,422,337 | 7/1947 | Chilowsky | 340/2 |

Primary Examiner—Milton Buchler
Assistant Examiner—Steven W. Weinrieb
Attorney—Fleit, Gipple & Jacobson ABSTRACT: An oceanographic survey device according to the invention comprises a buoy, means for mooring the buoy at a predetermined depth to the ocean bed, instruments attached to the buoy for one or more recorders carried by the buoy for measuring one or more parameters, means for causing the buoy to move up and down in the water along a substantially vertical line, and clock means for sequentially initiating operation of the means for causing the buoy to move at regular predetermined times after the buoy is moored. Means are provided for controlling the operation of the means for causing the buoy to move so that in response to each initiation of the operation thereof the buoy moves vertically in the water from the predetermined depth to a second depth and back to the predetermined depth.

3,628,205

OCEANOGRAPHIC SURVEY DEVICE

This invention relates to an oceanographic survey device.

It is a requirement in oceanography and related sciences to obtain data such as for example temperature, salinity, and current, at certain locations in the sea along vertical lines to obtain so-called profiles.

A usual method of obtaining a profile is to lower an instrument on a line from on board ship. In this way a continuous record of the measured quantity along the vertical path may be obtained. But the method is cumbersome, time-consuming and expensive.

Another method that is used is to moor a buoy at the intended location and to distribute measuring and recording instruments along the mooring line. However, in this way only a limited number of points along the profile can be observed and if dense observations are needed, the number of instruments required becomes prohibitive. Difficulties also exist in the data collection procedure. If each instrument is self-recording, synchronization of the records becomes a problem. If central storage is provided, electrical connections between instruments and a storage buoy are required, which introduces considerable technical problems.

It is an object of the present invention to provide a device in which the above difficulties are reduced.

According to the present invention there is provided an oceanographic survey device comprising, a. a buoy, b. means for mooring said buoy at a predetermined depth to the ocean bed, c. instruments attached to the buoy for one or more recorders carried by the buoy for measuring one or more parameters, d. means for causing said buoy to move up and down in the water along a substantially vertical line, after said buoy is moored, e. clock means adapted to sequentially initiate operation of said means for causing said buoy to move at regular predetermined times after said buoy is moored, and f. means adapted to control the operation of said means for causing said buoy to move so that in response to each initiation of the operation thereof by said clock means said buoy moves vertically in the water from said predetermined depth to a second depth and back to said predetermined depth.

Figure 2:
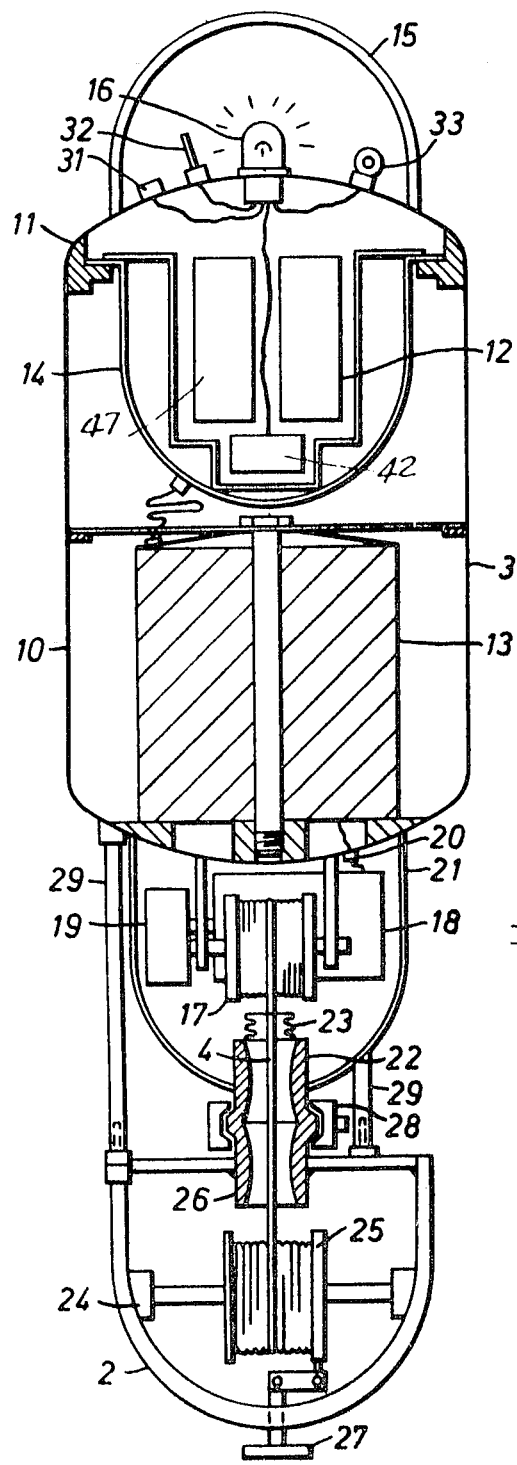
Figure 3C:
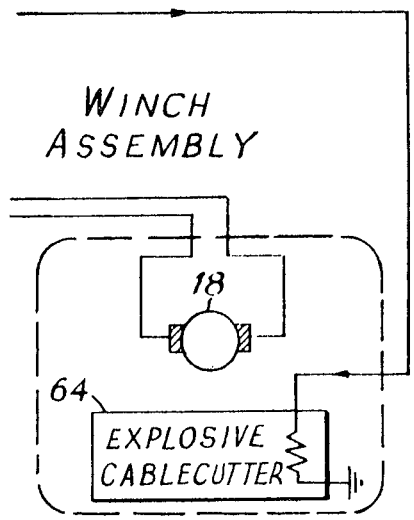
Figure 3A:
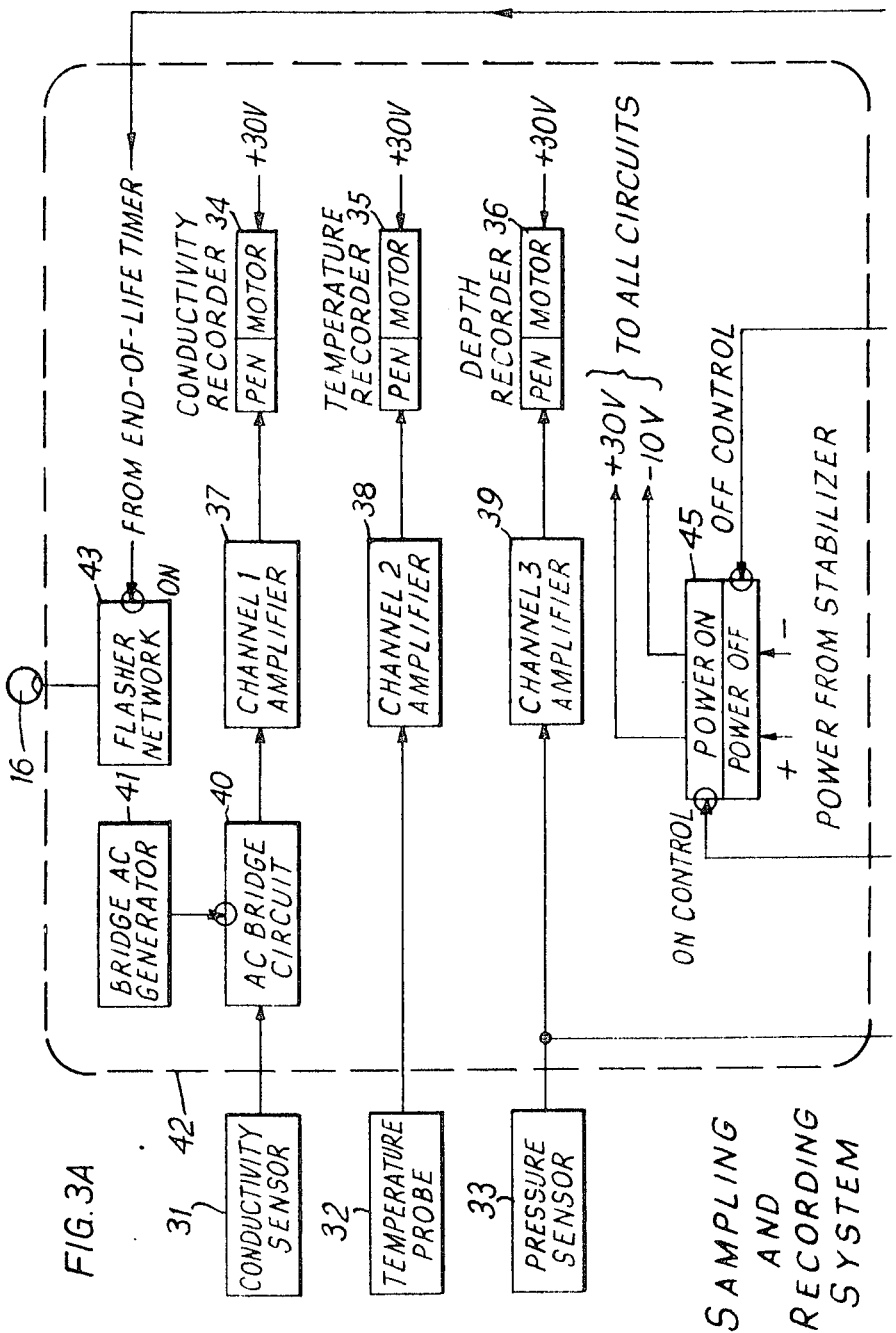
Figure 3B:
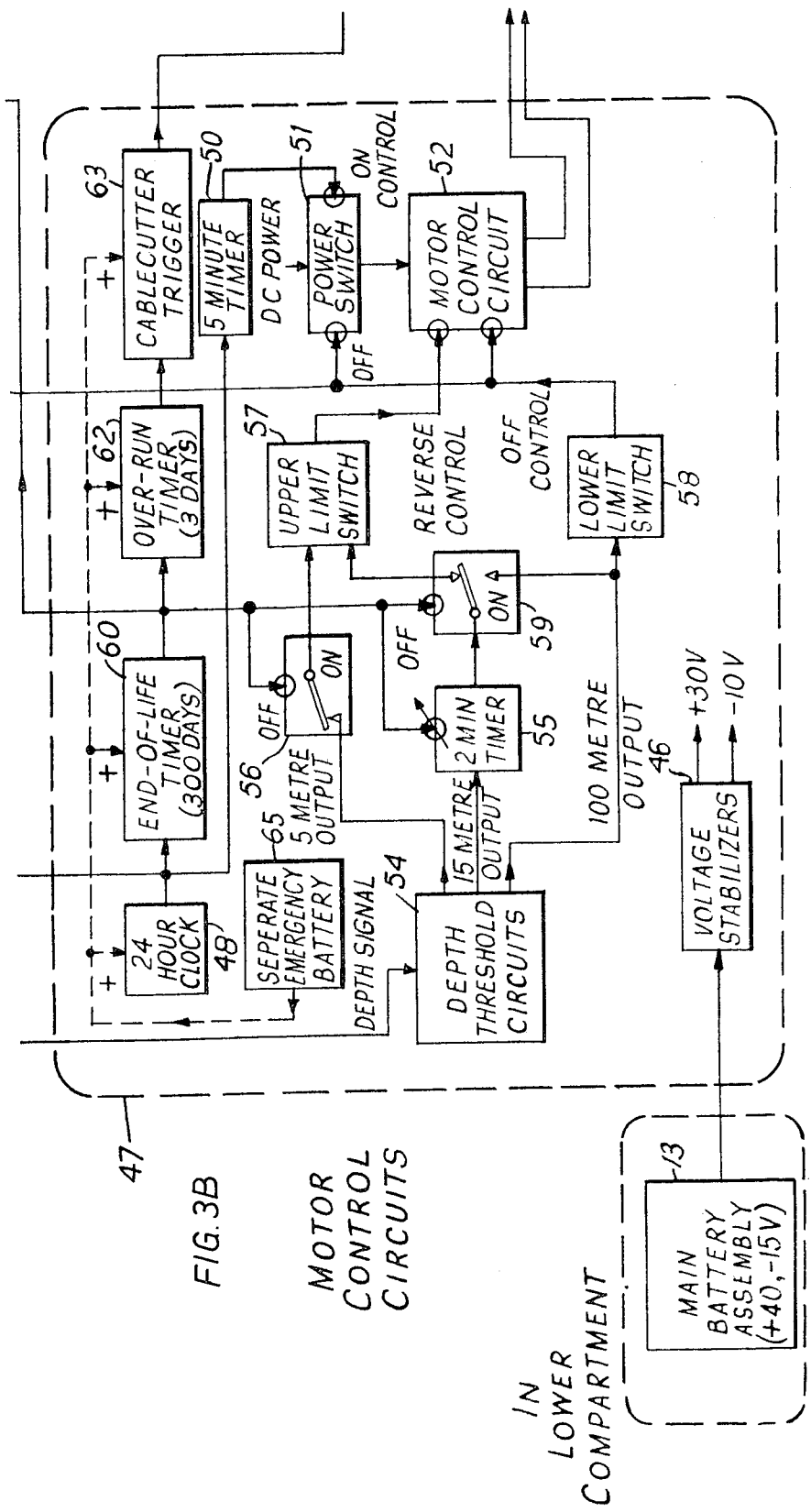

In order that the invention may be clearly understood and readily carried into effect, it will now be described with reference to the accompanying drawings of which:

FIG. 1 is a diagram showing an oceanographic survey device according to one example of the present invention, in different phases of its operation, FIG. 2 is a diagram showing in detail the construction of the buoy and anchor forming part of the device illustrated in FIG. 1, and FIG. 3 (divided into three parts 3A, 3B and 3C) is a block diagram of the programmed means for the device illustrated in FIG. 1.

As shown in the drawings, the survey device 1 comprises an anchor 2 and a buoy 3. The buoy consists of a buoyant chamber 10 designed to withstand submergence in the sea down to a limit below which it is not anticipated to descend (say, 1,500 feet). A bulkhead 11 at the upper end of the chamber 10 carries the various data collection instruments and also allows access to an upper compartment of the chamber 10 in which is located the control circuit 12 for controlling the cycling of the buoy and the switching of the instruments. An electric battery 13 is located within a lower compartment of the chamber 10 which, in order to guard against explosion hazards, arising from the generation of hydrogen, is hermetically sealed by cover 14 from the upper compartment containing the control circuit 12. A lifting ring 15 is attached to the bulkhead 11 as is a light 16 which is arranged to flash when the buoy is due to be recovered.

At the bottom end of the buoy and mounted externally is a winch 17, driven by a unit consisting of an electric motor 18 and gear train 19. This unit is arranged to run entirely in oil, requiring only a slow moving output shaft to be sealed against sea pressure. Electrical power to the motor is provided from the batteries 13 via underwater plugs and cable 20 connected through the wall of the chamber 10.

To avoid interference from marine life, the winch 17 and driving unit 18, 19 are completely enclosed in a shaped and freeflooding fairing 21. On the lower end of the fairing 21 is mounted a fair-lead 22 which guides and supports the mooring cable 4. A flexible rubber seal 23 allows the cable 4 to pass freely but restricts the opening in the fair-lead to prevent the ingress of anything but the smallest of marine life.

The anchor 2 is of the dead weight variety designed to produce a net anchoring force of the order of 70 to 90 pounds. It takes the form of a steel hemisphere with a straight flange of 4 to 5 inches. Mounted on bearings 24 within the hemisphere is a winch drum 25 carrying some of the mooring cable 4. A fair-lead 26 mounted centrally in the straight flange guides the cable 4 during payout and supports it when moored. A brake 27 on the winch drum 25 ensures that the mooring cable 4 pays out under tension and is so arranged that on impact with the ocean bed it automatically provides a permanent winch lock.

The arrangement just described prior to launch is in the form of a single package. The anchor 2 and its associated components are joined to the buoy 3 by means of a manacle 28 holding the fair-leads 22 and 26 in contact. Three separate struts 29 mounted from the top rim of the anchor 2 and bearing against the lower face of the buoy 3 keep the manacle 28 in tension and protect it from bending moments. The manacle 28 is held in place by a pressure sensitive plunger not shown set to release at the desired depth. Following release of the manacle the anchor 2 moves away from the buoy 3 as illustrated with reference to FIG. 1 and the three separate struts 29 fall free in the sea.

The instruments fitted to the buoy comprise a conductivity sensor 31, a temperature sensor 32 and a pressure sensor 33, the readings obtained from these three instruments enabling salinity data to be obtained. The instruments have individual recorders 34, 35 and 36 respectively (see FIG. 3A). The recorders in this particular example are pen recorders which are normally inoperative but are rendered operative periodically by the switching on of a 30 volt electric supply. The pens are moved electrically in response to the output of respective amplifiers 37, 38 and 39, which receive inputs from the instruments, by way of a bridge circuit 40 in the case of the sensor 31 and directly in the case of the sensors 32 and 33. The alternating current supply for the bridge circuit 40 is provided by a generator 41. The components 34 to 41 are included in a case 42 and in the same case there is a flasher network 43 for the recovery light 16. A switch 45 is also included in the case 42, and is operable periodically to apply electric power to the recorders 34, 35 and 36 and the associated instruments. The power input to the switch 45 is obtained via a voltage stabilizer 46 housed in a second case 47 in the upper compartment.

The case 47 (see FIG. 3B) contains the motor control circuit controlling the winch motor and thus buoy movements. The motor control circuit includes a clock 48 which emits an electric pulse once every 24 hours. Each pulse from the clock is applied to the switch 45 to switch on the power supply to the instruments in the case 42. It is also applied to a device 50 which produces a delay of 5 minutes, and is therefore called a 5 minute timer; this delay allowing the instruments to warm up. The delayed electric pulse from the timer 50 is applied to a power switch 51 and is instrumental in switching power via a control circuit 52 to the winch motor 18 of the buoy. As explained above the motor 18 controls the length of cable from the buoy to its anchor. Normally the pulse from the timer 50 occurs when the buoy is held by its anchor at a depth of about 100 meters and the motor control circuit is conditioned to cause the motor 18 to pay out cable from the winch 17 causing the buoy to rise.

As the buoy rises, the conductivity, temperature and pressure are continuously sensed, and recorded by the recorders 34, 35 and 36. The electric signal representing pressure from the sensor 33 is also applied to a depth threshold circuit 54 in the case 47, and the circuit 54 is arranged to produce an output pulse when the pressure is that corresponding to a depth of 100 meters, 15 meters and 5 meters.

When the output of the sensor 33 is that corresponding to a depth of 15 meters the circuit 54 applies a pulse to a device 55 which produces a 2 minute delay, and is called therefore a 2 minute timer. When a 15 meter pulse is produced after a delay of 2 minutes it is applied via a switch 59 to an upper limit switch 57 to tend to operate the latter, but normally the switch 57 will have been operated by a 5 meter pulse during the 2 minute delay so that the 15 meter pulse has no effect. The aforesaid 5 meter pulse is produced by the circuit 54 when the sensor 33 produces a pulse corresponding to a depth of 5 meters. This pulse is fed to a switch 56, which is normally in the condition illustrated so that the pulse passes to the upper limit switch 57. The response of the switch 57 to the 5 meter pulse is to change the condition of the motor control circuit so as to reverse the drive to the motor 18. The motor thereupon commences to take in cable and causes the buoy to descend. During the descent, a pulse is again applied at a depth of 15 meters to the 2 minute timer 55 but again the pulse is ineffectual. At a depth of 100 meters the circuit 54 feeds a pulse to a lower limit switch 58 and to the switch 59. The switch 59 is normally in the condition illustrated and so the pulse which is applied to it has no effect. The lower limit switch 58 does however respond to the pulse and operates the power switch 51 so as to switch off the power supply to the motor. The buoy then dwells at the lower depth until the occurrence of the next pulse from the clock 48. The output of the lower limit switch 58 also changes the circuit 52 to the condition for driving the motor in the sense for paying out cable, in readiness for the next ascent. The ascent and descent cycle of the buoy lasts for about 10 minutes and between successive cycles the buoy remains at 100 meters for about 23 hours and 50 minutes. The operation of the lower limit switch in response to the 100 meter pulse also causes the switch 45 to operate to switch off the power supply to the components in the case 42. Therefore all the components are rendered inoperative and remain so until about 5 minutes before the start of the next cycle. The output of a 15 meter pulse from the 2 minute timer 45 is only effective when the buoy is prevented from rising to the 5 meter level by, for example, downward projecting ice masses. In this event, the 15 meter pulse causes a descent to commence after a 2 minute delay.

The cyclic mode of operation which has been described continues for a number of days determined by an end-of-life timer 60. This receives and counts the pulses delivered by the clock 48 and in this example of the invention is arranged to produce an output signal after 300 days of operation. This output signal is applied to the switches 56 and 59 to change these switches to the alternate conditions from those shown. The output signal from the end-of-life timer 60 is also applied to the flasher network 43 to render this device operational. The pulse from the clock 48 which initiates the end-of-life signal from the timer 60 also initiates the last ascent of the buoy from its position of rest at 100 meters, in the manner already described. However during this ascent, the signal produced by the threshold circuit 54 at a depth of 15 meters is able to pass via the switch 59 to the lower limit switch 58, with however a delay of 2 minutes from the time when the 15 meter depth is reached. Therefore the ascent of the buoy continues beyond the 15 meter point. At 5 meters the threshold circuit 54 again produces an output signal but on this occasion it cannot proceed past the switch 56. The 2 minute delay provided by the timer 55 from the 15 meter point is adequate to allow the buoy to reach the surface of the sea so that the buoy is at the surface by the time the lower limit switch responds to the output of the 2 minute timer 55 and switches off the power to the motor 18 and to the electrical components in the compartment 42. The buoy then remains floating on the surface until recovered.

The buoy also includes means for automatically cutting the anchor cable if the buoy has not been recovered within 3 days from the output signal of the end-of-life timer 60. This means is provided as a safeguard against the possibility of component failure while the buoy is submerged, such as might cause the buoy to be locked by its mooring cable at some intermediate depth. The said means comprise an overrun timer 62 to which is applied the output signal of the end-of-life timer 60 and which itself produces an output signal 3 days later. The signal from 62 is applied to a trigger 63 which produces a firing signal for an explosive cable cutter 64 located in the vicinity of the cable winch (see FIG. 3C). Additional emergency means is provided in the form of an emergency battery 65, arranged to energize the clock 48, the end-of-life timer 60, the overrun timer 62 and the cable cutter trigger 63 in event of failure of the main battery 13 which is housed in the lower compartment of the buoy. Therefore even if the cyclic operation of the buoy is interrupted by failure of the main battery, the operations required to produce emergency release of the buoy to the surface will occur.

The launch and mooring sequence of the device described with reference to FIGS. 2 and 3 is depicted in FIG. 1.

As shown at (a) following impact with the sea the device 1 as a complete package falls to a depth, say 350 feet, at which point the pressure sensitive release mechanism releases the manacles 28 and allows the anchor 2 to separate from the buoy 3 as shown at (b). The winch 27 located in the anchor and carrying the main part of a mooring cable 4 now allows the cable to pay out and the anchor to descend in the sea. Throughout this phase the winch brake 27 maintains a tension in the mooring cable of approximately 45 pounds. The buoy 3, whose net buoyancy is say 50 pounds, now rises against the cable tension with a new upward force of approximately 5 pounds. The result is that the anchor 2 which weighs approximately 140 pounds, descends at about six times the velocity with which the buoy rises. Thus in a mooring depth of, say, 1,000 feet, the buoy will rise approximately 100 feet above the 350 feet separation point while the anchor descends to the bottom.

On impact at the sea bed as shown at (c), the winch 25 within the anchor 2 locks automatically and the buoy 3 is moored at a depth of approximately 250 feet. The tension in the mooring cable is now 50 pounds, that is, equal to the buoyancy of the float.

A preset time interval now elapses following which the clock 48 provides an initial pulse to switch 45 and the 5 minute timer 50. This, as above described causes the motor 18 to drive the auxiliary winch 17 in the buoy so that the float rises to its selected minimum depth or upper cycling limit (5 meters in this example). On reaching this depth, the depth sensing device 54 reverses the winch motor 18 which now winds in the cable pulling the buoy down to its maximum selected depth or lower cycling limit (100 meters). On reaching this depth, the depth sensing device 54 switches off the motor and allows the buoy to remain steady at this depth. The clock 48 thereafter measures a required time delay after which the motor is once more switched on and the buoy again rises to its upper limit and the entire cycle is repeated. During each cycle, the data collecting instruments 31, 32, 33 mounted in the buoy and the respective recorders 34, 35 and 36 are switched on. Thus, while moving through the water, the required data, in this case, pressure and salinity, are recorded and then stored.

In general, the time interval between two consecutive cycling operations, as well as the speed of ascent and descent may be adjustable to special needs. It is also possible to read data only during the way up, or down, or during both travels. Also, the rest period between the travel periods may be spent either at the lower or upper terminal, or may be divided between both.

Further, it is possible that instead of a continuous data profile, stops be introduced at certain levels to make certain measurements which might be disturbed by the motion or may require a certain time.

The cycling operation may alternatively be controlled by acoustic command from an external station, such as a ship, either in addition to or instead of the automatic control.

When the recovery sequence commences after the predetermined time, the buoy rises to the surface, as shown at (d), and has sufficient slack cable to remain there in maximum anticipated current conditions. Recovery may now be effected in a manner typical of conventionally moored surface buoys.

Among the advantages of a device which has been described are that data relating to a wide range of sea depths may be obtained from only a single cluster of instruments, and by mooring the buoy a reasonable depth below the ocean surface, damage and disturbance from wind, surface agitation, passing ships or human interference are reduced to a minimum.

The emergency release means above described for severing the mooring cable and allowing the buoy to rise to the surface may be replaced by some means sensitive to an acoustic command.

Many other modifications may be made. For example in some cases it may be preferable to reduce the weight or size of the buoy by omitting the winch 17 in the buoy and designing the winch 25 in the anchor 2 so as to perform the cycling operation in addition to its other function. In this case the motor 18 and gear train 19 would be located within the anchor 2 and a clutch would be provided to couple the output shaft of the gear train to the winch after the initial mooring phase is completed. The cycling limits may in this case be determined by markers attached to the cable 4 and sensed at the winch exit by a suitable sensor which would control the winch operations. The markers and sensors may be either mechanical or magnetic. A disadvantage of such cable markers may be that the cycling process would take place between two given cable "lenths-out" rather than two depth levels, and an uncertainty of depth may result when the buoy is pulled sideways and down by strong currents. Therefore, if direct control of the winch by buoy depth is required, this may be achieved by sensing the pressure at the buoy and signalling either electrically through a conductor in the cable or via an acoustic link to the winch control system in the anchor.

The recorders for the signals from the sensors may be digital recorders, suitable digital-to-analogue converters being then provided between the sensors and the recorders. Further or different sensors may also be provided, and obviously the period between successive cycles of operation may be varied as well as the operational life of the buoy.

The buoy described above is suitable for application in relatively shallow water, i.e., for depths to 1,000 feet approximately. In greater depths a greater buoyancy would be required to sustain a longer cable against currents, which in turn would require greater driving power for the cycling winch, therefore greater batteries, and the overall buoy size might become impractical. Therefore, in such cases, where a station is to be established in deep water, but a profile is required only in a comparatively shallow surface layer, a further buoy of considerable buoyancy (for example 1,000 lb. for a mooring in 3,000 fathoms depth) may be provided moored by a steel wire to the anchor at the bottom. The setting depth of this large supporting buoy may be varied, but may be typically 1,000 feet. This buoy now serves as a platform for the buoy 3 which may be made to cycle between limits set between the surface of the sea and the supporting buoy. The entire system, including both buoys, cables and sinker may again be packed into a single unit for automatic launch.

What we claim is:

1. An oceanographic survey device comprising,
   a. a buoy,
   b. means for mooring said buoy at a predetermined depth to the ocean bed,
   c. instruments attached to the buoy for one or more recorders carried by the buoy for measuring one or more parameters,
   d. means for causing said buoy to move up and down in the water along a substantially vertical line, after said buoy is moored,
   e. clock means adapted to sequentially initiate operation of said means for causing said buoy to move at predetermined regular times after said buoy is moored, and
   f. means adapted to control the operation of said means for causing said buoy to move so that in response to each initiation of the operation thereof by said clock means said buoy moves vertically up and down in the water from said predetermined depth to a second depth and back to said predetermined depth.

2. A device according to claim 1 in which the means adapted to control the operation of said means for causing said buoy to move up and down include pressure sensitive means carried by the buoy.

3. A device according to claim 1 in which said means for causing said buoy to move up and down comprises a motor carried by said buoy.

4. A device according to claim 1 including release means for allowing said buoy to rise to the surface of the water after a predetermined number of up and down movements, while still retaining said buoy attached to said mooring means.

5. A device according to claim 4 including means for disconnecting said buoy from said mooring means at a predetermined time after its normal release time, if said release means has not operated.

6. An oceanographic survey device comprising,
   a. a buoy,
   b. a cable wound on a winch, an anchor, and means for mooring said buoy at a predetermined depth to the ocean bed via said cable and said anchor,
   c. instruments attached to said buoy for one or more recorders carried by said buoy for measuring one or more parameters,
   d. a further winch, and a motor operative on said further winch for paying out and taking in said cable, after said buoy is moored,
   e. a clock device adapted to sequentially initiate operation of said motor at predetermined regular times after said buoy is moored, and
   f. pressure sensitive means carried by said buoy adapted to control the operation of said motor so that in response to each initiation of the operation of said motor by said clock device, said cable is paid out and taken in via said further winch so that said buoy moves vertically in the water from said predetermined depth to a second depth and back to said predetermined depth.

* * * * *